Nov. 19, 1935.　　　C. O. FELL　　　2,021,625
LAWN EDGING TOOL
Filed Dec. 6, 1933
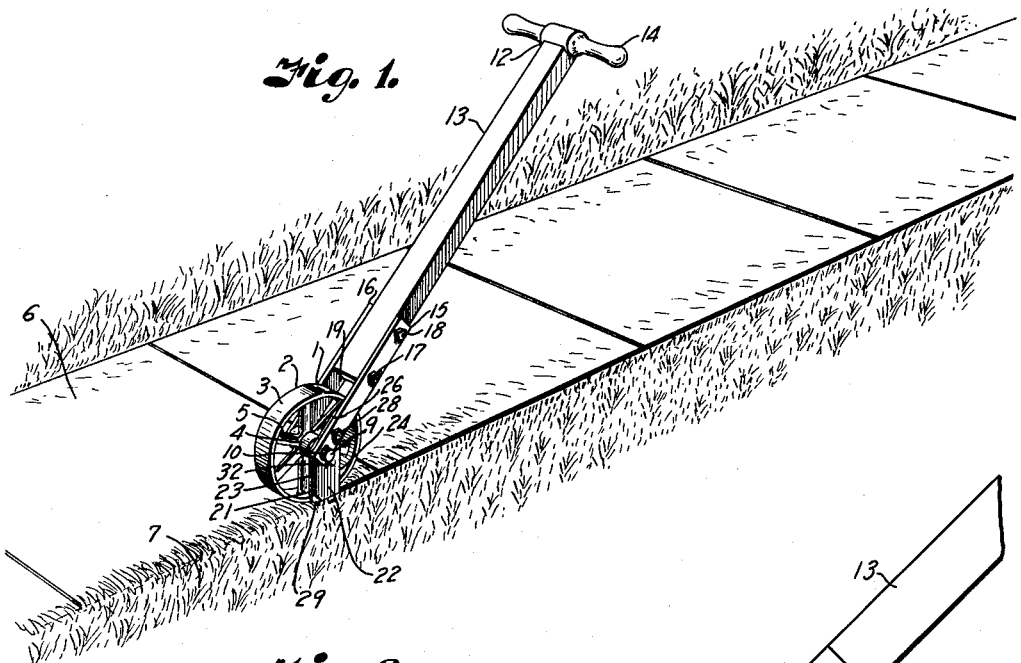
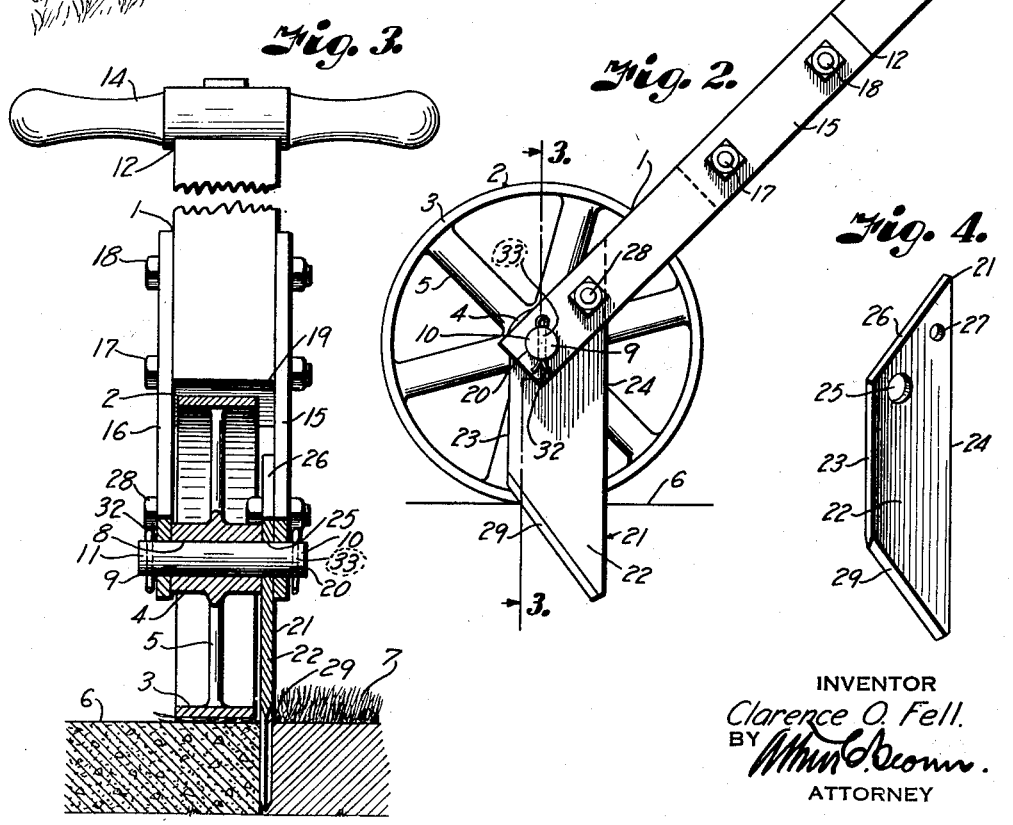
INVENTOR
Clarence O. Fell.
BY
ATTORNEY Patented Nov. 19, 1935

2,021,625

UNITED STATES PATENT OFFICE 2,021,625

LAWN EDGING TOOL

Clarence O. Fell, Kansas City, Mo.

Application December 6, 1933, Serial No. 701,130

3 Claims. (Cl. 97—227)

My invention relates to lawn edging tools and has for its principal object to provide a tool of this character which will effectively trim the loose ends of grass and like plants projecting over the edges of walks, driveways and curbing extending through and bordering a lawn.

In order to trim the grass along such places, it is necessary that the cutting implement be moved in guiding contact with the bordering object and that it should cut into the soil to provide a smooth even trim line. Consequently, the cutting edges soon become so dull that they will not cut loose ends of grass.

It is, therefore, an important object of the present invention to hold the loose ends of the grass in clamping contact with the edge of the walk while the cut is being made in order that sharpness of the cutting edge is not critical in accomplishing an effective cut.

Other important objects of the invention are to selectively vary the effective cutting angle of the knife and to provide a knife mounting whereby the knife is easily removed for sharpening when required.

In accomplishing these and other objects of the present invention, I have provided improved details of structure, the preferred form of which is illustrated in the accompanying drawing, wherein:

Fig. 1 is a perspective view of a lawn edging tool constructed in accordance with my invention and showing the method of holding the loose ends of grass while they are being cut.

Fig. 2 is a side elevational view of the tool, particularly showing the relation of the cutting edge to the contact point of the supporting wheel.

Fig. 3 is a vertical section through the wheel and knife blade on the line 3—3, Fig. 2.

Fig. 4 is a perspective view of the knife blade.

Referring more in detail to the drawing:

1 designates a lawn edging tool including a supporting wheel 2 preferably comprising a circular flange 3 and a hub 4 connected to the flange by radial spokes 5. The flange 3 of the wheel flange is preferably flat and is of sufficient width to give required bearing on the walk 6 which extends along the edge of the lawn 7.

Extending through an axial bore 8 of the hub is a shaft or axle 9 having projecting ends 10 and 11 to form bearing supports for a handle 12 by which the tool is propelled along the walk.

The handle comprises a shaft 13 provided with a handle bar 14 at its upper end and straps 15 and 16 at its lower end having their upper ends fixed to the side edges of the shaft by bolts 17 and 18 extending through openings in the shaft and aligning openings in the straps. The lower ends of the straps project below the end of the shaft and provide a fork 19 for straddling the wheel and bearing openings 20 to mount the projecting ends of the shaft therein, as shown in Fig. 3. The handle shaft is preferably of suitable width, so that the straps are spaced thereby a sufficient distance to accommodate the width of a knife blade 21 between the end of the wheel hub and the strap 15.

The knife blade 21 comprises a flat bar 22 preferably of trapezoidal shape and arranged on the tool so that the parallel sides 23 and 24 thereof normally extend in parallel relation to the vertical diameter of the wheel. The upper end at the front or shorter side 23 of the blade is provided with an opening 25 to mount the blade on the shaft in position so that the upper inclined edge 26 extends flush with the upper edge of the strap, when the handle is in normally inclined position and the parallel edges of the blade are perpendicular to the walk, as shown in Fig. 2. To retain the blade in fixed relation with the handle the upper corner thereof is provided with an opening 27 which registers with a similar opening in the strap to pass a bolt 28.

The length of the blade is such that the end of the front edge terminates above the periphery of the wheel, while the opposite edge projects a substantial distance below the wheel to form a guide for engaging the edge of the walk to retain the tool in guided relation therewith. The lower edge is, therefore, inclined upwardly in the direction of travel of the wheel and carries a cutting edge 29 extending at an angle across the plane of the walk at a point slightly in advance of the contact point of the wheel with the surface of the walk.

In assembling the parts just described, the blade is secured to the strap 15 by the bolt 28 and moved to such a position that the opening 25 therein aligns with the opening 20 in the strap and with the bore 8 of the hub 4.

After the parts are thus aligned, the wheel axle 9 is slid into place and retained by cotter pins 32 or the like that are inserted in transverse openings 33 formed in the ends of the axle as shown in the drawing. By thus mounting the blade, the axle takes much of the shearing strain from the bolt 28 so that downward pressure may be applied to the handle in effecting difficult cuts without endangering the knife mounting.

In using the device constructed and assembled as described, the wheel is pushed along the edge of the walk guided by the depending end of the knife blade. As the device is being propelled, the downwardly inclined cutting edge readily cuts off the portions of grass projecting over the wall since the loose ends thereof are held thereagainst by pressure of the wheel, as shown in Fig. 1.

It is, therefore, apparent that due to the fact that the flat face of the wheel engages and holds down the loose ends of the grass the degree of sharpness of the knife blade is not critical and the blade can be operated over long periods between sharpening operations.

Angularity of the cutting edge may be varied to suit conditions by holding the handle at a different angle to the walk with the handle pivoting upon the axis of the wheel axle.

What I claim and desire to secure by Letters Patent is:

1. A lawn edging device including a wheel for holding down loose ends of grass extending over an object bordering a lawn, a handle member connected with the wheel, and a blade fixed to the handle member having a cutting edge positioned in substantial alignment with the holding point of the wheel for cutting off said projecting ends of the grass while they are being held down by the wheel.

2. A lawn edging device including a wheel for holding down loose ends of grass extending over an object bordering a lawn, a handle member connected with the wheel, and a blade fixed to the handle member having an inclined cutting edge positioned in substantial alignment with the holding point of the wheel for cutting off said projecting ends of the grass while they are being held down by the wheel.

3. A lawn edging device including a wheel for holding down loose ends of grass extending over an object bordering a lawn, a handle member connected with the wheel, and a trapezoidal shaped blade fixed to the handle member and having a cutting edge positioned in substantial alignment with the holding point of the wheel with the loose ends of the grass for cutting off said projecting ends of the grass while they are being held down by the wheel.

CLARENCE O. FELL.